2,961,423
Patented Nov. 22, 1960

2,961,423

CROSSED-LINKED STYRENE-ALLYL ALCOHOL COPOLYMERS AS BINDERS FOR FIBROUS FILLERS AND STRUCTURAL UNITS MANUFACTURED THEREFROM

Earl C. Chapin, Springfield, Mass., assignor to Monsanto Chemical Company, St. Louis, Mo., a corporation of Delaware No Drawing. Filed Apr. 3, 1958, Ser. No. 726,023

9 Claims. (Cl. 260—41)

This invention relates to novel resinous binders. More particularly, it relates to laminates of fibrous fillers bonded with thermosetting modified styrene-allyl alcohol copolymers.

Fiber glass laminates are in widespread use for such uses as boat hulls, fishing rods, lightweight structural units, etc. Many binders for glass fibers have been suggested, the most common making use of a mixture of a polyester containing a reactive double bond and a polymerizable monomer such as styrene. However, such polyester laminates suffer from inadequate dimensional stability due to hydrolysis of the ester linkages. It has further been found that insufficient adhesion between the glass fibers and the cured polyester binder results in the eventual migration of glass fibers from the laminate.

It is an object of this invention to provide fiber reinforced laminates employing a novel binding resin.

Another object is to provide fiber glass laminates having high dimensional stability.

A further object is to provide fiber glass laminates having high adhesion between the glass fibers and the binding resin such that migration of the fibers from the laminate is obviated.

These and other objects are attained by impregnating and coating fibrous materials with a fluid thermosetting resinous binder composition comprising a mixture of (1) from 20–60 parts by weight of a styrene-allyl alcohol copolymer containing from 2–10% by weight of hydroxyl groups, (2) from 80–40 parts by weight of a styrene monomer and (3) from 0.05–3.0 equivalents of an alpha, beta ethylenically unsaturated dicarboxylic acid, or an acrylic acid, per equivalent of hydroxyl groups in the styrene-allyl alcohol copolymer.

The following examples are given in illustration of the invention and are not intended as limitations thereof. Where parts are mentioned, they are parts by weight.

Example I

Thirty parts of a styrene-allyl alcohol copolymer containing 4.5% by weight (about 0.08 eq.) of hydroxyl groups and having a specific viscosity of 0.5 (as measured in a solution of 10 parts of copolymer in 100 ml. of methyl-ethyl-ketone at 25° C.) and 10 parts (about 0.2 eq.) of maleic anhydride are dissolved in 20 parts of styrene monomer. One-tenth part of benzoyl peroxide is dissolved in the viscous solution which is then poured onto a mat of glass fibers in a suitable molding vessel lined with sheets of polytetrafluoroethylene. Pressure is applied by means of a polytetrafluoroethylene covered piston and the resinous mixture is polymerized in situ by heating the mold to 85° C. for about 2 hours. A translucent, rigid laminate is obtained which is unaffected by water, xylene or 10% sodium hydroxide.

Example II

Example I is repeated using 30 parts of a styrene-allyl alcohol copolymer containing 8% by weight (about 0.14 eq.) of hydroxyl groups and having a specific viscosity of 1.5 (as measured in a solution of 10 grams of copolymer in 100 ml. of methyl-ethyl-ketone at 25° C.). 7.2 parts (about 0.1 eq.) of acrylic acid are used in place of the maleic anhydride. A translucent, rigid laminate is obtained which is unaffected by water, xylene or 10% sodium hydroxide.

The resinous binder of this invention is predominantly a styrene-allyl alcohol copolymer cross-linked with minor proportions of a styrene monomer and an alpha, beta ethylenically unsaturated dicarboxylic acid or an acrylic acid.

The styrene-allyl alcohol copolymers employed in this invention are those containing from 2–10% by weight of hydroxyl groups and which, as a further limitation, have a specific viscosity of from 0.3–2.5, as measured at 25° C. on 10 grams of copolymer dissolved in 100 ml. of methyl-ethyl-ketone. In place of the styrene moiety in these copolymers there may be substituted alphamethylstyrene or a mono- or di-ring substituted methyl- or chloro-derivative of styrene or alphamethylstyrene. Similarly, the allyl alcohol moiety may be replaced by methallyl alcohol. One method for preparing these copolymers involves hydrogenating the corresponding styrene-acrolein copolymer.

Styrene is the preferred styrene monomer employed in the practice of this invention. However, if desired, the mono- and di-ring substituted methyl- or chloro-derivatives thereof may be substituted for all or part of the styrene.

The alpha, beta ethylenically unsaturated dicarboxylic acids employed in this invention are those containing from 4–8 carbon atoms, e.g., maleic acid, itaconic acid, citraconic acid, mesaconic acid, fumaric acid, etc. Acrylic or methacrylic acid may be substituted for all or part of the alpha, beta ethylenically unsaturated dicarboxylic acids. If desired, the anhydrides or the mixed anhydrides of these acids may be employed in substitution therefor. In a preferred embodiment, maleic anhydride is employed.

The resinous binder composition is formulated by dissolving from 20–60 parts by weight of the styrene-allyl alcohol copolymer in from 80–40 parts by weight of the styrene monomer, a total of 100 parts by weight of these two materials being used. To this solution is added a quantity of one of the above alpha, beta ethylenically unsaturated carboxylic acids or an anhydride thereof in proportions corresponding to from 0.05–3.0 equivalents of acid per equivalent of hydroxyl groups contained in the styrene-allyl alcohol copolymer.

In use the resinous binder compositions of this invention may be cross-linked and hardened at room temperature by incorporating therein minor proportions of conventional free radical polymerization initiators. For example, peroxides such as benzoyl peroxide, ditertiarybutyl peroxide, tertiary butyl perbenzoate, pinacolone peroxide, hydrogen peroxide, etc. and hydroperoxides such as tertiarylbutyl cumene, tertiarybutyl hydroperoxide, etc. Other suitable free radical initiators include air, oxygen, ozonides, azo compounds and high energy radiations. Redox catalyst systems may also be employed. These include combinations of one of the previously mentioned peroxide initiators with a reductant, e.g., amines such as dimethyl aniline, mono-, di- or tri-ethanol amine, etc., glycols such as ethylene glycol etc., cobalt or lead naphthenate, etc., etc. Generally, from 0.5–5% initiator by weight, based upon the total weight of the binder composition, will be used. Curing may optionally be effected in the absence of initiator by heating the laminate casting at elevated temperatures, e.g., up to 250° C., for extended periods of time. However, the use of a free radical initiator is preferred.

The resinous binder composition is mixed with or poured into an organic or inorganic fibrous filler of fabrics, sheets or mats thereof according to conventional techniques. In addition to fiber glass fillers there may be used other mineral fillers such as mineral wool, asbestos, etc.; cellulosic fillers such as cotton flock, cloth, rayon, paper, hemp, sisal, bagasse, wood flour, corn cob, etc.; and synthetic fillers such as nylon, etc. Depending on the fabrication techniques employed, panels containing a plurality of fibrous plies may be made. Tubes, cylinders, rods, etc. may also be fabricated using the resinous binder compositions of this invention.

The superior adhesive properties of the resinous binder necessitates precautions to avoid permanent adherence of the casting to the mold. Therefore, mold release lubricants or sheets of non-polar films, e.g., polytetrafluoroethylene etc., should be applied to all mold surfaces before casting. Laminates prepared from the compositions of this invention are translucent and rigid. They have been found to be unaffected by xylene, 10% sodium hydroxide solutions or water. They possess superior dimensional stability since they are composed of a high proportion of aromatic hydrocarbon units.

The principles of this invention may be applied to the construction of such articles of manufacture as boat hulls, fishing rods, blinds, decorative paneling, lightweight structural units, etc. They may also be applied to the manufacture of electrically insulative sheets, panels, tubes, tapes, etc., capable of withstanding humid conditions over extended periods of time.

Furthermore, the compositions of this invention may be modified by the incorporation therein of conventional additives such as pigments, stabilizers, lubricants, etc.

It is obvious that many variations may be made in the products and processes of this invention without departing from the spirit and scope thereof.

What is claimed is:

1. A fluid thermosetting resinous binder composition for inert fibrous fillers comprising (1) from 20 to 60 parts by weight of a copolymer of a first component selected from the group consisting of styrene, alphamethstyrene, and the mono- and di-ring-substituted methyl- and chloro-derivatives thereof and a second component selected from the group consisting of allyl and methallyl alcohols, said copolymers containing from 2 to 10% hydroxyl groups by weight, (2) from 80 to 40 parts by weight of a monomer selected from the group consisting of stryrene and the mono- and di-ring-substituted methyl- and chloro-derivatives thereof and (3) from 0.05 to 3.0 equivalents of an alpha,beta-ethylenically unsaturated carboxylic monomer per equivalent of hydroxyl groups in said copolymer, said alpha,beta-ethylenically unsaturated carboxylic monomer being selected from the group consisting of acrylic acid, methacrylic acid, alpha,beta-ethylenically unsaturated dicarboxylic acids containing from 4 to 8 carbon atoms and the anhydrides and mixed anhydrides thereof.

2. A fluid thermosetting resinous binder composition for inert fibrous fillers as in claim 1 wherein the copolymer is a copolymer of styrene and allyl alcohol and the monomer is styrene.

3. A fluid thermosetting resinous binder composition for inert fibrous fillers as in claim 1 wherein the copolymer is a copolymer of styrene and allyl alcohol, the monomer is styrene and the alpha,beta-ethylenically unsaturated carboxylic monomer is maleic anhydride.

4. As an article of manufacture, a reinforced cross-linked copolymer comprising an inert fiber filled polymerization product of (1) from 20 to 60 parts by weight of a copolymer of a first component selected from the group consisting of styrene, alphamethylstyrene, and the mono- and di-ring-substituted methyl- and chloro-derivatives thereof and a second component selected from the group consisting of allyl and methallyl alcohols, said copolymer containing from 2 to 10% hydroxyl groups by weight, (2) from 80 to 40 parts by weight of a monomer selected from the group consisting of styrene and the mono- and di-ring-substituted methyl- and chloro-derivatives thereof and (3) from 0.05 to 3.0 equivalents of an alpha,beta-ethylenically unsaturated carboxylic monomer per equivalent of hydroxyl groups in said copolymer, said alpha,beta-ethylenically unsaturated carboxylic monomer being selected from the group consisting of acrylic acid, methacrylic acid, alpha,beta-ethylenically unsaturated dicarboxylic acids containing from 4 to 8 carbon atoms and the anhydrides and mixed anhydrides thereof.

5. An article of manufacture as in claim 4 wherein the inert fibers are fiber glass.

6. An article of manufacture as in claim 4 wherein the copolymer is a copolymer of styrene and allyl alcohol and the monomer is styrene.

7. An article of manufacture as in claim 4 wherein the copolymer is a copolymer of styrene and allyl alcohol, the monomer is styrene and the alpha,beta-ethylenically unsaturated carboxylic monomer is maleic anhydride.

8. An article of manufacture as in claim 4 wherein the copolymer is a copolymer of styrene and allyl alcohol, the monomer is styrene and the alpha,beta-ethylenically unsaturated carboxylic monomer is maleic anhydride and the inert fibers are fiber glass.

9. A process for preparing a reinforced cross-linked copolymer which comprises (1) preparing a fluid thermosetting resinous binder composition by (a) dissolving from 20 to 60 parts by weight of a copolymer containing from 2 to 10% hydroxyl groups by weight in from 80 to 40 parts by weight of a monomer, (b) further dissolving therein from 0.05 to 3.0 equivalents of an alpha,beta-ethylenically unsaturated carboxylic monomer per equivalent of hydroxyl groups in said copolymer and (c) further dissolving therein, immediately prior to use, from 0.05 to 5%, based upon the total weight of the solution, of a free radical initiator and (2) coating and impregnating an inert fibrous material with said resinous binder composition to firmly bond said inert fibrous material; said copolymer being a copolymer of a first component selected from the group consisting of styrene, alphamethylstyrene, and the mono- and di-ring-substituted methyl- and chloro-derivatives thereof and a second component selected from the group consisting of allyl and methallyl alcohols; said monomer being selected from the group consisting of styrene and the mono- and di-ring-substituted methyl- and chloro-derivatives thereof; said alpha, beta-ethylenically unsaturated carboxylic monomer being selected from the group consisting of acrylic acid, methacrylic acid, alpha,beta-ethylenically unsaturated dicarboxylic acids containing from 4 to 8 carbon atoms and the anhydrides and mixed anhydrides thereof.

References Cited in the file of this patent

UNITED STATES PATENTS

| | | |
|---|---|---|
| 2,630,430 | Shokal et al. | May 3, 1953 |
| 2,746,896 | Thompson | May 22, 1956 |

FOREIGN PATENTS

| | | |
|---|---|---|
| 679,562 | Great Britain | Sept. 17, 1952 |